(12) United States Patent
Moon et al.

(10) Patent No.: US 11,060,914 B2
(45) Date of Patent: Jul. 13, 2021

(54) CALIBRATION SYSTEM FOR ATTENUATED TOTAL REFLECTION SPECTROMETRY

(71) Applicants: Agilent Technologies, Inc., Santa Clara, CA (US); Agilent Technologies, Inc., Santa Clara, CA (US)

(72) Inventors: Christopher Ryan Moon, Los Gatos, CA (US); Charles Hoke, Menlo Park, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 173 days.

(21) Appl. No.: 16/147,826

(22) Filed: Sep. 30, 2018

(65) Prior Publication Data

US 2020/0103278 A1 Apr. 2, 2020

(51) Int. Cl.
| | | |
|---|---|---|
| *G01J 3/42* | (2006.01) | |
| *G01J 3/02* | (2006.01) | |
| *G01J 3/06* | (2006.01) | |
| *G01N 21/552* | (2014.01) | |
| *G01J 3/28* | (2006.01) | |

(52) U.S. Cl.
CPC ............... *G01J 3/42* (2013.01); *G01J 3/021* (2013.01); *G01J 3/06* (2013.01); *G01N 21/552* (2013.01); *G01J 2003/2879* (2013.01)

(58) Field of Classification Search
CPC .................................................. G01N 21/552
See application file for complete search history.

(56) References Cited

U.S. PATENT DOCUMENTS

| | | | | |
|---|---|---|---|---|
| 4,547,068 A | * | 10/1985 | Covey | G01N 21/552 250/339.08 |
| 9,863,877 B2 | | 1/2018 | Hoke | |
| 2012/0088486 A1 | * | 4/2012 | Messerchmidt | G01J 3/0264 455/418 |
| 2017/0082538 A1 | * | 3/2017 | Hoke | G02B 17/006 |
| 2017/0085810 A1 | * | 3/2017 | Moon | H04N 5/33 |

FOREIGN PATENT DOCUMENTS

| | | |
|---|---|---|
| EP | 0786665 A1 | 7/1997 |
| WO | 2015/167417 A1 | 11/2015 |
| WO | 2018/008025 A1 | 1/2018 |

OTHER PUBLICATIONS

International Search Report dated Oct. 18, 2019, PCT/US2019/043287.

* cited by examiner

*Primary Examiner* — Shawn Decenzo

(57) ABSTRACT

An ATR scanner and method for calibrating the same are disclosed. The scanner includes an ATR objective having a reflecting face and an optical port adapted to receive a first light beam, and to focus the first light beam to a point, at a location on the reflecting face such that the first light beam is reflected by the reflecting face and no portion of the first light beam strikes the reflecting face at an angle greater than the critical angle. A detector measures an intensity of light reflected from the reflecting face. A controller controls the location of the focal point and determines an intensity of light that was incident on the reflecting face as a function of the position on the reflecting face and an intensity of light that was reflected from the reflecting face as a function of position on the reflecting face.

15 Claims, 3 Drawing Sheets

CALIBRATION SYSTEM FOR ATTENUATED TOTAL REFLECTION SPECTROMETRY

BACKGROUND OF THE INVENTION

Quantum cascade lasers provide a tunable mid-infrared (MIR) light source that can be used for spectroscopic measurements and images. Many chemical components of interest have molecular vibrations that are excited in the MIR region of the optical spectrum, which spans wavelengths between 5 to 25 microns. Hence, measuring the absorption of MIR light at various locations on a sample can provide useful information about the chemistry of the sample as a function of position on the sample.

One class of imaging spectrometers measures the light directly reflected from the sample as a function of position on the sample and wavelength of the illuminating MIR light. The amount of light that is reflected depends on both the chemical and physical attributes of the sample, since light can be lost both by absorption in the sample, which reflects the chemical composition of the specimen and by scattering, which depends on the physical state of the surface of the specimen. Hence, comparing spectra generated with direct reflection to absorption with known chemical absorption spectra that are available in libraries presents significant challengers.

Systems that utilize attenuated total reflection (ATR) to illuminate the specimen avoid the problems caused by scattering of the incident light by the specimen. For example, U.S. Pat. No. 9,863,877, issued Jan. 9, 2018 describes a scheme for scanning a portion of a specimen using ATR. However, providing a calibration of the illumination intensity at each point in the field of view and at each wavelength at which the attenuation is measured presents challenges.

SUMMARY

The present invention includes a scanner and method for calibrating a scanner using attenuated total reflection optics. The scanner includes an ATR objective having a first optical element that includes a reflecting face, the reflecting face being characterized by a critical angle, and an optical port adapted to receive a first light beam, and to focus the first light beam to a point, characterized by a location on the reflecting face, and a wavelength such that the first light beam is reflected by the reflecting face and no portion of the first light beam strikes the reflecting face at an angle greater than the critical angle. The scanner also includes a detector that measures an intensity of light reflected from the reflecting face and a scanning system that controls the location on the reflecting surface. The scanner also includes a controller that controls the scanning system and determines an intensity of light that was incident on the reflecting face as a function of the position on the reflecting face and an intensity of light that was reflected from the reflecting face as a function of position on the reflecting face.

In one aspect of the invention, the wavelength is determined by the controller.

In another aspect of the invention, the scanning system receives the second light beam and converts the second light beam to the first light beam.

In another aspect of the invention, the controller stores an attenuation map of the reflecting face that provides an attenuation value for each point on the reflecting face as a function of the wavelength, the wavelength assuming a plurality of different values.

In another aspect of the invention, the controller determines an intensity of light striking the reflecting face from a measurement of an intensity of light striking a calibration location on the reflecting face prior to the reflecting face contacting a specimen and the attenuation map.

In another aspect of the invention, the controller repeats the determination of the intensity of light for a plurality of different wavelengths of the second light beam.

In another aspect of the invention, the controller is adapted to determine locations on the reflecting face that are not in contact with the specimen after the specimen has been in contact with the reflecting face.

In another aspect of the invention, the controller determines an intensity of light striking the reflecting face from a measurement of an intensity of light striking a location on the reflecting face that is not in contact with the specimen while another location on the reflecting face is in contact with the specimen.

In another aspect of the invention, the scanner also includes a light source that generates the first light beam, the scanner is characterized by a first optical path between the light source and the ATR objective and a first gaseous environment along the optical path; and a calibration system that receives the first light signal and directs the first light signal along a calibration path having a optical path length and a gaseous environment substantially the same as the first optical path and the first gaseous environment, respectively, and returns the first light signal to the detector.

The method is directed to calibrating a scanner that includes an optical element includes a reflecting face, the reflecting face is characterized by a critical angle, an optical port adapted to receive a first light beam, characterized by a wavelength, and to cause the first light beam to strike a measurement point, characterized by a location on the reflecting face, such that the first light beam is reflected by the reflecting face and no portion of the first light beam strikes the reflecting face at an angle greater than the critical angle, a detector adapted to measure the intensity of light reflected from the measurement point, and a controller that is adapted to control the location. The method includes causing the controller to determine an intensity of light that was incident on the reflecting face as a function of the location of the measurement point and an intensity of light that was reflected from the reflecting face as a function of position on the reflecting face for a plurality of different wavelengths, and causing the controller to determine an attenuation map of the reflecting face that provides an attenuation value for each point on the reflecting face as a function of the wavelength of the first light beam.

In another aspect of the invention, the controller determines an intensity of light striking the reflecting face from a measurement of an intensity of light striking a calibration location on the reflecting face prior to the reflecting face contacting a specimen and the attenuation map.

In another aspect of the invention, the controller repeats the determination of the intensity of light for a plurality of different wavelengths.

In another aspect of the invention, the controller is caused to determine locations on the reflecting face that are not in contact with the specimen after the specimen has been in contact with the reflecting face.

In another aspect of the invention, the controller determines an intensity of light striking the reflecting face from a measurement of an intensity of light striking a location on the reflecting face that is not in contact with the specimen while another location on the reflecting face is in contact with the specimen.

In another aspect of the invention, the first light beam traverses a path characterized by a first path length and a first gaseous environment between a light source that generates the first light beam and the reflecting face, the method further includes:

providing a calibration optical path having a path length and gaseous environment substantially the same as the first path length and the first gaseous environment; and measuring a calibration light intensity of the first light beam after the first light beam has traversed the calibration optical path as a function of wavelength of the first light beam.

DETAILED DESCRIPTION

Figure 1:
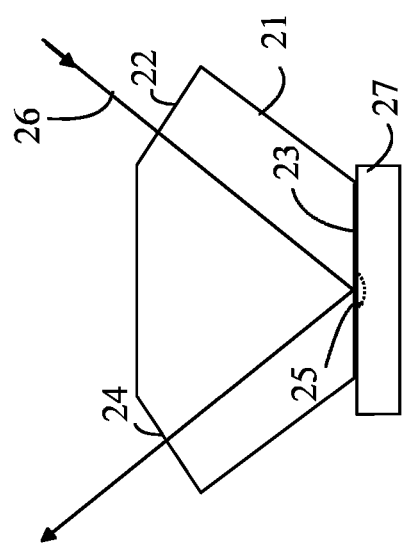
FIG. 1 illustrates a simple ATR optical system that is attached to a specimen.

The manner in which the present invention provides its advantages can be more easily understood with reference to FIG. 1, which illustrates a simple ATR optical system that is attached to a specimen. FIG. 1 is a cross-sectional view of an interface crystal that can facilitate the measurement of the absorption of light by a sample 27 in the reflective geometry mode. Crystal 21 has a high index of refraction. Light beam 26 enters crystal 21 through port 22 and strikes facet 23 at an angle that is greater than the critical angle. The light beam is totally reflected from facet 23 and exits the crystal through port 24. At the point at which the light beam is reflected from facet 23, the electric field associated with the light beam extends outside the crystal as shown at 25. If the medium under facet 23 absorbs light at the wavelength of light beam 26, the evanescent field will interact with the medium and energy will be transferred from the light beam to the medium. In this case, the energy in the beam leaving crystal 21 will be reduced. The difference in intensity between the input and output beams as a function of wavelength is a spectrum that matches a high-quality transmission spectrum and can easily be used for matching conventional spectra for various chemical compounds.

While an interface crystal of the type discussed above is useful in measuring a MIR spectrum of a point on a sample, it presents challenges if an image of an area on the specimen is needed, particularly if the surface of the specimen is not smooth. To form an image, the interface must be moved relative to the specimen. To prevent the interface crystal from damaging the specimen, the specimen must be moved vertically to allow the crystal to be located at the next point of interest. The time for such point-to-point measurements makes a combination imaging and spectrometer instrument impractical unless very long times are available to generate a spectrum at each point on a specimen in high resolution.

Figure 2:
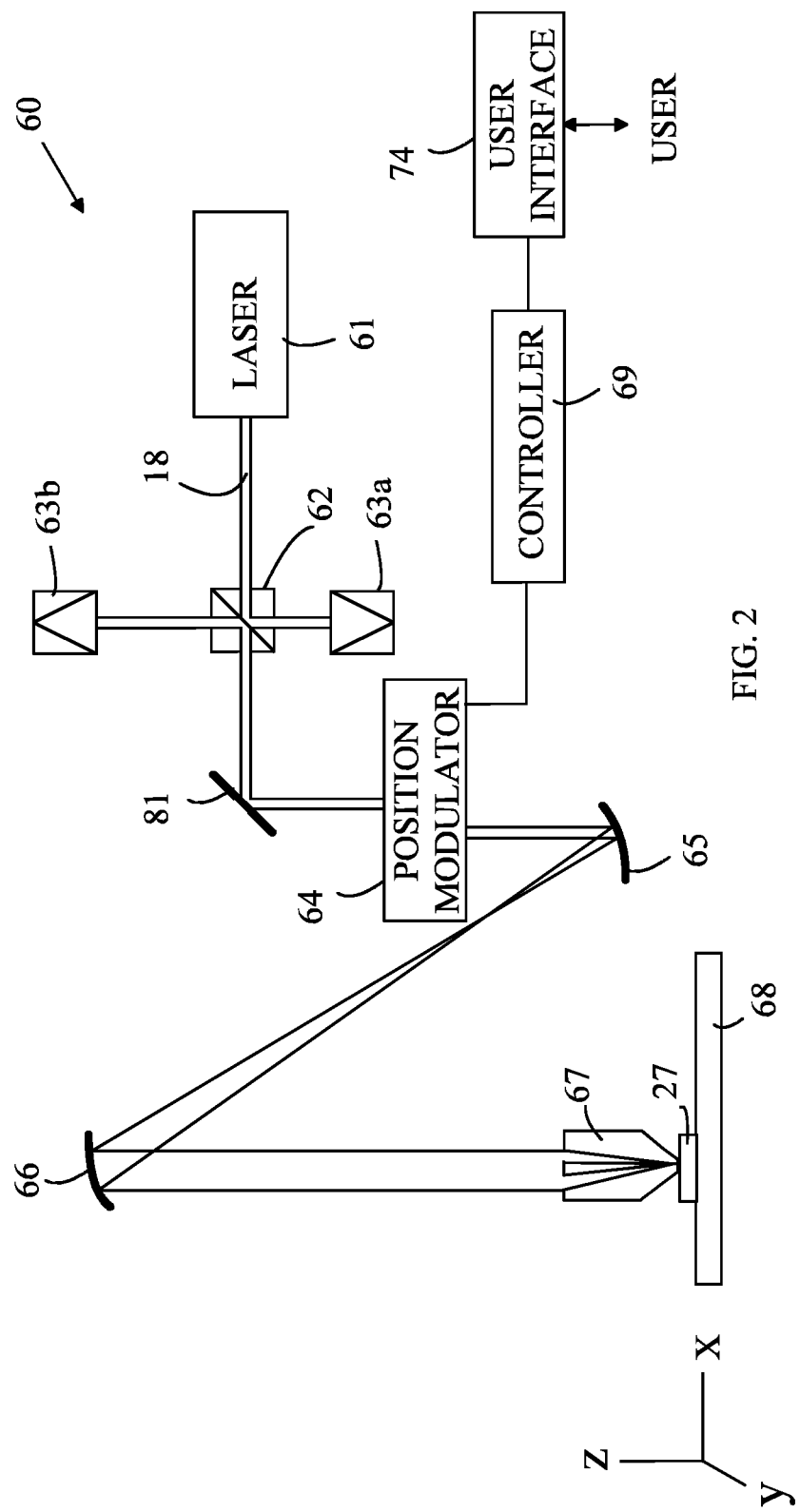
FIG. 2 illustrates a scanning ATR system in which the present invention can be practiced.

The above-described US Patent teaches an ATR measurement system in which the point of interaction of the input light beam can be rapidly scanned across the specimen without the need to move the crystal. Refer now to FIG. 2, which illustrates a scanning ATR system 60 in which the present invention can be practiced. Light 18 from laser 61 is split by beam splitter 62 into two beams. The first beam is directed to detector 63a, which measures the intensity of the laser pulse. The second beam is directed to position modulator 64 which adjusts the point of illumination of the beam on an off-axis parabolic reflector 65. The position of illumination determines the position at which the light from parabolic reflector 65 strikes a second off-axis parabolic reflector 66. Parabolic reflector 66 re-collimates the beam and sets the diameter of the beam to match the input aperture of ATR objective 67. The inclination of the beam entering ATR objective 67 is determined by the point of illumination on parabolic reflector 65. The light reflected back by ATR objective 67 retraces the path of the incoming light and a portion of that light is directed by beam splitter 62 into detector 63b. Controller 69 can then determine the amount of light that was lost in the reflection from ATR objective 67, and hence, determine the amount of light absorbed by sample 27. To image another small area on sample 27, controller 69 operates a three axis stage 68.

Many specimens of interest have irregular surfaces. The resulting height variations are often much greater than the depth of the electric field at the reflection surface in the ATR objective. As noted above, the depth of the field below the reflection surface of the ATR objective is a few microns. Hence, unless the surface variations are less than a few microns, or the sample is compressible, when the objective is brought into contact with the specimen there are isolated points of contact that, typically, cannot be predicted in advance. A specimen whose surface variations are less than 3 microns over the area that contacts the bottom surface of the ATR objective will be defined to be a flat specimen.

Even in the simple case of measuring the absorption spectrum of the specimen at a single location as a function of $\lambda$, there are significant challenges. To measure the absorption, the system must "know" the incident light intensity on the reflecting surface of the ATR objective crystal at the point at which the light is focused. The electric field in the specimen is only a few microns deep; hence, the amount of material being exposed is quite small. The optical path from the laser to the specimen is many centimeters, and hence, any absorber in that path can alter the intensity by an amount that is significant when compared to the light actually absorbed by the specimen.

While detector 63a can measure the light intensity of the light leaving laser 61, that detector cannot measure the light intensity of the beam that actually strikes the reflecting surface of ATR objective 67. The optical path between beam splitter 62 and ATR objective 67 is not a vacuum. The light must pass through a gaseous environment that has absorption bands in the MIR. Those absorption bands reduce the light that reaches the reflecting surface of the ATR objective and also the light that is returned from the surface. For example, the path typically includes some level of water vapor. The water vapor absorption is a function of wavelength and temperature. These variations can vary over short periods of time, and hence, need to be calibrated immediately prior to any scan of absorption as a function of frequency.

In addition, as noted above, the point(s) of contact with the specimen are, in general, not predictable. Once the point of contact is determined, the intensity of the incoming light must be corrected for variations that are a function of the point on the crystal at which the light is directed. These intensity variations are also a function of wavelength.

In principle, the beam intensity at each point on the reflecting surface of ATR objective 67 could be measured as a function of wavelength just prior to moving the ATR objective such that the objective touches the specimen. However, the time to perform such a calibration is typically tens of minutes. Furthermore, the background's absorption can vary over such time periods, rendering the calibration "out of date" by the time the actual measurements are to be made.

To simplify the following discussion, define a Cartesian coordinate with the x-y plane parallel to the reflecting surface of the ATR objective as shown in FIG. 2. In general, there is a calibration function $I(x,y, \lambda)$ that provides the intensity of light in the incoming beam to the ATR objective that is focused to location (x,y) on the reflecting surface of the ATR objective when the wavelength of the incident light is $\lambda$. To compute the absorption of the sample at (x,y) when the incident light has wavelength $\lambda$, the system needs to know the intensity of the light striking the surface when no sample is present and the fraction of the reflected light that is absorbed prior to reaching detector 63b. The absorption is then computed from the difference in this initial intensity and the intensity measured by detector 63b.

The present invention is based on the observation that $I(x,y, \lambda)$ can be factored into two functions in which one of the functions does not change significantly over time during the measurements and the other function can be measured by a calibration measurement at one point in the field of vision of the ATR objective.

$$I(x,y,\lambda)=G(x,y,\lambda)P_0(\lambda)$$

Where $P_0(\lambda)$ is incident, light intensity is measured at a predetermined point in the field of view of the ATR objective before the ATR objective contacts the sample, and $G(x,y, \lambda)$ is a slowly varying function in both space and wavelength. The function G is determined by geometric parameters that cause the incident power to vary across the field of view. G also depends on the wavelength of the incident light. It should be noted that G is a slowly varying function of both (x,y) and $\lambda$, and hence, can be sparsely sampled and interpolated as needed. $G(x,y, \lambda)$ may be viewed as a geometric attenuation function that provides a measure of the fraction of the light from the laser that reaches the reflecting surface and returns from that surface when there is no specimen in contact with the reflecting surface.

For any given wavelength, $G(x,y, \lambda)$ are measured by measuring the reflected power when the incident beam is directed to (x,y) and the ATR objective is not in contact with the specimen. The function is then normalized by dividing all of the measured output power values by the power measured at some predetermined location such as (0,0). As noted above, $G(x,y, \lambda)$ is a slowly varying function of (x,y) and $\lambda$. Accordingly, $G(x,y, \lambda)$ can be sampled on a sparse grid and values for intermediate points in space and wavelength can be obtained by interpolation. The present invention is based on the observation that $G(x,y, \lambda)$ does not change rapidly over time. However, $P_0(\lambda)$ does change sufficiently with time, and hence, $P_0(\lambda)$ needs to be measured just prior to measuring each sample.

In one exemplary embodiment, $P_0(\lambda)$ as function of $\lambda$ over the desired range of $\lambda$ values is measured at (0,0) just prior to the sample being brought into contact with the ATR objective. These measured calibration values are then stored for use in generating a measurement of the incident beam during an absorption measurement at a point in which the sample is touching the ATR objective. The incident light intensity at the measurement point at a wavelength, $\lambda$, is $G(x,y, \lambda)P_0(\lambda)$, where (x,y) is the coordinate of the measurement point on the face of the ATR objective and $P_0(\lambda)$ is the measured beam intensity at (0,0) for the light of wavelength $\lambda$.

As noted above, many samples of interest are not flat, and hence, the sample only makes contact with the reflecting surface of the ATR objective in isolated areas. The locations of the contact areas, in general, cannot be determined in advance. In one aspect of the invention, the specimen is brought into contact with the sample and then the field of view of the ATR objective is scanned at one or more wavelengths to identify the areas that absorb light at the wavelengths in question. A map of the absorbing areas is provided to the user via user interface 74 shown in FIG. 2, and the user indicates the location at which an absorption spectrum (i.e., absorption as a function of $\lambda$ for a range of $\lambda$ values) is to be generated.

Regions of the field of view of the ATR objective that are not absorbing are due to the sample surface being separated from the ATR objective surface by a distance that is greater than the effective depth of the electric field generated by the light that is reflected from the inner surface of the ATR objective. In one aspect of the invention, one of these regions is used to measure $P_0(\lambda)$ during the absorption spectrum measurements in a manner analogous to that described above with respect to measuring $P_0(\lambda)$ at (0,0) just prior to the sample being brought into contact with the ATR objective. The resultant $P_0(\lambda)$ value can then be used to update the instrument calibration function. For example, when measuring the absorption as a function of $\lambda$ at a location that is in contact with the specimen, the beam can be switched to the calibration location and a measurement of $P_0(\lambda)$ made to verify the calibration.

It should be noted that the calibration scheme discussed above captures both losses between the light source and ATR objective and losses on the return bath from the ATR objective to the detector.

The above-described embodiments of the present invention have utilized a particular type of ATR objective to direct the light beam to a measurement point on the face of the totally reflecting optic and to measure the light reflected therefrom. However, the calibration method of the present invention can be practiced with any spectrometer that directs a light beam to a point on the reflecting surface at an angle less than the critical angle and measures the reflected light as a function of position on the reflecting surface and wavelength of the reflecting light. In the above-described embodiments, a single port directs the light to the reflecting surface and collects the light reflected therefrom. Embodiments that have separate ports for inputting the light and collecting the reflected light could also be utilized. Similarly, other types of scanning systems can be utilized to move the point of contact of the incoming light beam on the reflecting surface.

In the above-described embodiments, $P_0(\lambda)$ is measured by measuring the light reflected from the reflecting surface of the ATR objective at a predetermined location on the reflecting surface prior to the location in question being brought into contact with the specimen. In some cases, it may be advantageous to measure $P_0(\lambda)$ after the specimen has been brought into contact with the specimen to ensure that $P_0(\lambda)$ has not changed during the measurements. As noted above, if there is a location on the reflecting surface that is not in contact with the specimen after the specimen has been brought into contact with the reflecting surface because of irregularities in the specimen surface, that point can be utilized; however, such non-contact locations may not always be present.

Figure 3:
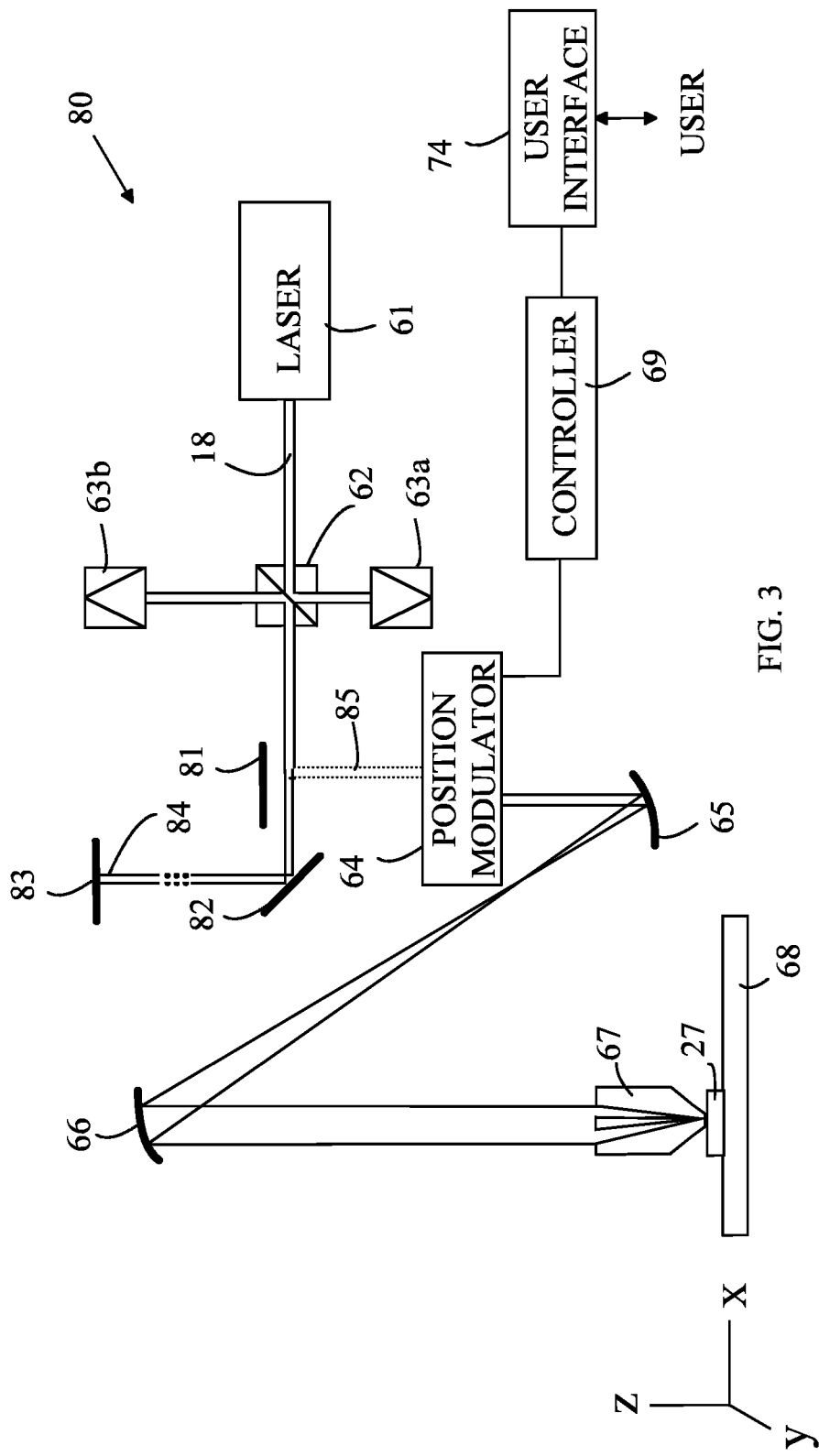
FIG. 3 illustrates an embodiment of the present invention that allows $P_0(\lambda)$ to be measured even after the specimen has been brought into contact with the specimen.

Refer now to FIG. 3, which illustrates an embodiment of the present invention that allows $P_0(\lambda)$ to be measured even after the specimen has been brought into contact with the specimen. Those elements of scanning ATR system 80 that perform functions analogous to functions described above with respect to scanning ATR system 60 have been given the same numeric designations and will not be discussed in detail here. Scanning ATR system 80 differs from scanning ATR system 60 in that mirror 81 that directs the laser beam along path 85 to and from the position modulator rotates such that the laser output is routed to a calibration optical path 84 by mirrors 82 and 83. The calibration optical path has the same path length as the path to and from the ATR reflecting surface and is located in the same chamber as the ATR objective and associated position modulator and parabolic reflectors 65 and 66. Hence, the beam intensity returned from this calibration optical path measures $P_0(\lambda)$. This measurement can be performed without changing the position of the specimen relative to the reflecting surface when the wavelength of the laser is changed or any time at which a verification of $P_0(\lambda)$ is required by merely rotating mirror 81.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A scanner comprising:
   an ATR objective comprising:
   a first optical element comprising a reflecting face, said reflecting face being characterized by a critical angle; and
   an optical port adapted to receive a first light beam and to focus said first light beam to a point, characterized by a location on said reflecting face, and a wavelength such that said first light beam is reflected by said reflecting face and no portion of said first light beam strikes said reflecting face at an angle greater than said critical angle;
   a detector that measures an intensity of light reflected from said reflecting face, said detector being separated from ATR objective by an optical path that includes an optically absorptive medium that absorbs a fraction of said first light beam that traverses said optical path;
   a scanning system that controls said location; and
   a controller that controls said scanning system, determines said fraction, and determines an intensity of light that was incident on said reflecting face as a function of said position.

2. The scanner of claim 1 wherein, said wavelength is determined by said controller.

3. The scanner of claim 1 wherein said scanning system receives a light beam and converts said light beam to said first light beam.

4. The scanner of claim 1 wherein said controller stores an attenuation map of said reflecting face that provides an attenuation value for each point on said reflecting face as a function of said wavelength, said wavelength assuming a plurality of different values.

5. The scanner of claim 4 wherein said controller determines an intensity of light striking said reflecting face from a measurement of an intensity of light striking a calibration location on said reflecting face prior to said reflecting face contacting a specimen and said attenuation map.

6. The scanner of claim 5 wherein said controller repeats said determination of said intensity of light for a plurality of different wavelengths of said first light beam.

7. The scanner of claim 5 wherein said controller is adapted to determine locations on said reflecting face that are not in contact with said specimen after said specimen has been in contact with said reflecting face.

8. The scanner of claim 7 wherein said controller determines an intensity of light striking said reflecting face from a measurement of an intensity of light striking a location on said reflecting face that is not in contact with said specimen while another location on said reflecting face is in contact with said specimen.

9. The scanner of claim 1 further comprising:
   a light source that generates said first light beam, said scanner being characterized by a first optical path between said light source and said ATR objective and a first gaseous environment along said first optical path; and
   a calibration system that receives said first light beam and directs said first light signal along a calibration path having a optical path length and a gaseous environment substantially the same as said first optical path and said first gaseous environment, respectively, and returns said first light signal to said detector.

10. A method for calibrating a scanner comprising an optical element comprising a reflecting face, said reflecting face being characterized by a critical angle, an optical port adapted to receive a first light beam, characterized by a wavelength, and to cause said first light beam to strike a measurement point, characterized by a location on said reflecting face, such that said first light beam is reflected by said reflecting face and no portion of said first light beam strikes said reflecting face at an angle greater than said critical angle, a detector adapted to measure the intensity of light reflected from said measurement point, and a controller that is adapted to control said location, said method comprising:
   causing said controller to determine an intensity of light that was incident on said reflecting face as a function of said location of said measurement point and an intensity of light that was reflected from said reflecting face as a function of position on said reflecting face for a plurality of different wavelengths; and
   causing said controller to determine an attenuation map of said reflecting face that provides an attenuation value for each point on said reflecting face as a function of said wavelength of said first light beam.

11. The method of claim 10 wherein said controller determines an intensity of light striking said reflecting face from a measurement of an intensity of light striking a calibration location on said reflecting face prior to said reflecting face contacting a specimen and said attenuation map.

12. The method of claim 11 wherein said controller repeats said determination of said intensity of light for a plurality of different wavelengths.

13. The method of claim 12 wherein said controller is caused to determine locations on said reflecting face that are not in contact with said specimen after said specimen has been in contact with said reflecting face.

14. The method of claim 13 wherein said controller determines an intensity of light striking said reflecting face from a measurement of an intensity of light striking a location on said reflecting face that is not in contact with said specimen while another location on said reflecting face is in contact with said specimen.

15. The method of claim 10 wherein said first light beam traverses a path characterized by a first path length and a first gaseous environment between a light source that generates said first light beam and said reflecting face, said method further comprising:
  providing a calibration optical path having a path length and gaseous environment substantially the same as said first path length and said first gaseous environment; and
  measuring a calibration light intensity of said first light beam after said first light beam has traversed said calibration optical path as a function of wavelength of said first light beam.

\* \* \* \* \*